(12) United States Patent
Kaneda et al.

(10) Patent No.: US 8,473,609 B2
(45) Date of Patent: Jun. 25, 2013

(54) DATA TRANSMISSION METHOD AND SERVER FOR SUBSTATION MONITORING CONTROL SYSTEM

(75) Inventors: Keiichi Kaneda, Fuchu (JP); Setsuo Tamura, Nakahara-ku (JP); Yasumasa Watabe, Mitaka (JP); Junya Nagata, Hachioji (JP); Satoshi Takahashi, Tama (JP); Hiroshi Ichikawa, Fuchu (JP); Ken Kasuga, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 148 days.

(21) Appl. No.: 13/146,659

(22) PCT Filed: Jan. 28, 2009

(86) PCT No.: PCT/JP2009/000335
§ 371 (c)(1),
(2), (4) Date: Sep. 14, 2011

(87) PCT Pub. No.: WO2010/086894
PCT Pub. Date: Aug. 5, 2010

(65) Prior Publication Data
US 2011/0320590 A1 Dec. 29, 2011

(51) Int. Cl.
*G06F 15/173* (2006.01)
(52) U.S. Cl.
USPC .......................................................... 709/224
(58) Field of Classification Search
USPC .......................................................... 709/224
See application file for complete search history.

(56) References Cited

U.S. PATENT DOCUMENTS

| 5,659,543 | A  | * | 8/1997 | Ater et al. ..................... 370/258 |
| 6,332,159 | B1 | * | 12/2001 | Hatae et al. ................... 709/224 |
| 2005/0222933 | A1 | * | 10/2005 | Wesby ............................ 705/36 |

FOREIGN PATENT DOCUMENTS

| JP | 5 292572 | 11/1993 |
| JP | 6 14478 | 1/1994 |
| JP | 10 257673 | 9/1998 |
| JP | 2000 341882 | 12/2000 |
| JP | 2002 233081 | 8/2002 |
| JP | 2004 274931 | 9/2004 |
| JP | 2007 151394 | 6/2007 |

OTHER PUBLICATIONS

International Search Report Issued Apr. 7, 2009 in PCT/JP09/000335 filed Jan. 28, 2009.

* cited by examiner

*Primary Examiner* — Benjamin R Bruckart
*Assistant Examiner* — Sm Rahman
(74) *Attorney, Agent, or Firm* — Oblon, Spivak, McClelland, Maier & Neustadt, L.L.P.

(57) ABSTRACT

According to one embodiment, a server 11 performs aggregate signal processing for n-to-one signal transmission. The processing includes waiting processing and time adjusting processing. In the waiting processing, from a time point where a first constitutional element signal constituting a specific aggregate signal bound for the upper level control center reaches the server until a wait time that is based on a preset condition elapses, the server waits for another constitutional element signal of the specific aggregate signal to arrive (S202-S208). In the time adjusting processing, the server extracts an earliest generation time from generation times attached respectively to constitutional element signals arriving during the waiting processing, and attaches the extracted time as a generation time of the specific aggregate signal (S210).

6 Claims, 13 Drawing Sheets

*FIG. 7*

| 111 ID OF SUBSTATION PREMISES SIGNALS | 113 TRANSMISSION METHOD | 112 ID OF SIGNALS BOUND FOR UPPER LEVEL CONTROL CENTER |
|---|---|---|
| SIG1 | IEC61850 | SIG-A |
| SIG2 | IEC61850 | SIG-B |
| SIG3 | IEC61850 | SIG-B |
| SIG4 | IEC61850 | SIG-B |
| SIG5 | IEC61850 VIA IEC60870-5-103 | SIG-B |
| SIG6 | IEC61850 VIA IEC60870-5-103 | SIG-B |
| SIG9 | IEC61850 | SIG-C |
| SIG10 | IEC61850 | SIG-C |
| SIG11 | IEC61850 | SIG-C |
| SIG12 | IEC61850 | SIG-D |
| SIG13 | IEC61850 VIA IEC60870-5-103 | SIG-D |
| SIG14 | IEC61850 VIA IEC60870-5-103 | SIG-D |
| SIG15 | IEC61850 VIA IEC60870-5-103 | SIG-D |
| SIG16 | IEC61850 VIA IEC60870-5-103 | SIG-D |

Server (11), 103 SETDATA

- PRIOR ART -

- PRIOR ART -

- PRIOR ART -

- PRIOR ART -

- PRIOR ART -

- PRIOR ART -

DATA TRANSMISSION METHOD AND SERVER FOR SUBSTATION MONITORING CONTROL SYSTEM

FIELD

The present invention relates to a data transmission method and a server for a substation monitoring control system that implements transmission between a substation and an upper level control center.

BACKGROUND

To transmit monitoring data from substation premises to a remote monitoring system, a method such as temporarily storing the data, to which a time is attached, and transmitting the data while coordinating an amount of communication data to be transmitted to the remote monitoring system with an amount of stored data is conventionally employed, as described in Patent Document 1. Further, all required data are transmitted.

In recent years, data transmission methods applied to a substation monitoring control system have been set in accordance with international IEC standards such that on substation premises, IEC 61850 is applied to a communication network and IEC 0870-5-103 is applied to a protection control device, while IEC 60870-5-101 or IEC 60870-5-104 is applied to communication between the substation and an upper level control center for the purpose of remote monitoring control.

These IEC standards describe individual contents, respectively, and in a substation monitoring control system, signals from the upper level control center and signals from the substation must be mutually converted by appropriately switching the transmission method.

FIG. 10 is a block diagram showing an example of a substation monitoring control system to which the aforementioned IEC standards are applied. In FIG. 10, 10 denotes a server, 20 denotes a line terminal on the substation premises, and 30 denotes an upper level control center in a remote location.

To simplify the description, terminal numbers such as "1" to "k", "m", and "x" (where k, m, and x are integers of two or more, and k<m<x) are allocated to the line terminals 20. Further, in order to identify individual elements, a hyphen and an individual terminal number are added to the reference numeral "20" of the respective blocks indicating the individual line terminals 20.

As shown in FIG. 10, a plurality of line terminals 20-1, ..., 20-k on the substation premises having the terminal numbers "1" to "k" are connected to the server 10 of the substation monitoring control system via a transmission line (an internal communication network) 41, and IEC 61850 is applied as a signal transmission method between the line terminals 20 having the terminal numbers "1" to "k" and the server 10.

Further, a plurality of line terminals 20-m, ..., 20-x on the substation premises having the terminal numbers "m" to "x" are connected to the line terminal 20-k having the terminal number "k", which is connected to the server 10, and IEC 60870-5-103 is applied as a signal transmission method employed on a transmission line 42 between these line terminals. As a result, the terminals 20-m, ..., 20-x having the terminal numbers "m" to "x" transmit signals to the server 10 via the line terminal 20-k having the terminal number "k", which serves as a master station.

Furthermore, the server 10 is connected to the upper level control center 30 via a transmission line 43 to which IEC 60870-5-101 or IEC 60870-5-104 is applied.

Among the aforementioned IEC standards, IEC 60870-5-101 and IEC 60870-5-104, which describe transmission methods for remote monitoring control communication, exhibit lower transmission efficiency than IEC 61850, which is a transmission method applied to a communication network on substation premises. Due to the difference in transmission efficiency between these transmission methods and a difference between a signal amount on the substation premises and a signal amount between the substation and the upper level control center, signal transmission for transmitting a signal from the substation premises to the upper level control center can be broadly divided into two types, namely one-to-one signal transmission shown in FIG. 11 and n-to-one signal transmission shown in FIG. 12.

FIG. 11 is a view showing an example of one-to-one signal transmission employed in the substation monitoring control system shown in FIG. 10. In FIG. 11, a signal SIG1 transmitted from the line terminal 20-1 having the terminal number "1" to the server 10 in accordance with IEC 61850 is transmitted as is from the server 10 to the upper level control center 30 as a signal SIG-A in accordance with IEC 60870-5-101 or IEC 60870-5-104. One-to-one signal transmission therefore signifies signal transmission in which a one-to-one correspondence relationship is realized between a substation side signal and a signal bound for the upper level control center.

FIG. 12 is a view showing an example of n-to-one signal transmission employed in the substation monitoring control system shown in FIG. 10. In FIG. 12, signals SIG2 to SIG6 transmitted from the line terminals 20-1, 20-2, 20-k having the terminal numbers "1", "2", "k" to the server 10 in accordance with IEC 61850 are aggregated into a signal SIG-B by the server 10 and then transmitted to the upper level control center 30 in accordance with IEC 60870-5-101 or IEC 60870-5-104.

Among these signals, the signals SIG2 to SIG4 are transmitted directly to the server 10 from the line terminals 20-1, 20-2, 20-k. The signal SIG5 and the signal SIG6, on the other hand, are obtained by converting signals SIG7, SIG8, which are transmitted from the line terminals 20-m, 20-x having the terminal numbers "m", "x" in accordance with IEC 60870-5-103, in the line terminal 20-k.

Hence, n-to-one signal transmission signifies signal transmission in which a plurality of (n) signals from the substation premises are aggregated into a single aggregate signal before being transmitted to the upper level control center such that an n-to-one correspondence relationship is realized between the substation side signals and the signal bound for the upper level control center.

Patent Document 1: Japanese Patent Application Laid-open No. 2002-233081
Patent Document 2: Japanese Patent Application Laid-open No. 5-292572

Incidentally, in the case of the n-to-one signal transmission shown in FIG. 12, international standards do not provide any specific definitions of a correlative relationship between a signal order in which the signals from the substation premises reach the server 10 and a generation time attached to the signals.

As shown in FIG. 13, therefore, no correlative relationship exists between the sequence {T1, T2, T3, T4, T5} of generation times T1 to T5 attached to the signals SIG2 to SIG6 transmitted to the server 10 from the substation premises and the sequence {ST1, ST2, ST3, ST4, ST5} of arrival times ST1 to ST5 at the server 10.

Hence, as shown in FIG. 13, a situation may arise whereby, of the signals SIG2 to SIG6, the signal SIG2 having the latest generation time T5 reaches the server at the earliest arrival time ST1 while the signal SIG5 having the earliest generation time T1 reaches the server at the latest arrival time ST5. During normal aggregation processing in this case, the generation time T5 of the signal SIG2 that arrives first, despite being the latest generation time of the signals SIG2 to SIG6, is attached inappropriately as the generation time of an aggregate signal obtained by aggregating the signals.

As shown in FIGS. 14 and 15, this situation arises due to a time lag generated in accordance with the data transmission method corresponding to the IEC standard. This point will be described below.

FIG. 14 is a view showing a time lag occurring between the occurrence of an event and transmission when a signal is transmitted from the line terminal 20-1 to the server using the IEC 61850 transmission method. As shown in FIG. 14, with the IEC 61850 transmission method, a time lag LAG1 exists between the occurrence of an event and transmission of the signal, and the time lag LAG1 varies according to a processing condition of the transmission source line terminal 20-1 and the condition of the transmission line. As a result, synchronization cannot be achieved between the plurality of line terminals that transmit signals using the IEC 61850 transmission method.

FIG. 15 is a view showing a time lag LAG2 occurring between the occurrence of an event and transmission to the server when a signal is transmitted between line terminals using the IEC 60870-5-103 transmission method and then transmitted from the line terminal serving as the master station to the server using the IEC 61850 transmission method.

As shown in FIG. 15, when the signal is transmitted between line terminals using the IEC 60870-5-103 transmission method, the line terminals 20-m, 20-x serving as slave stations become capable of signal transmission only after being polled by the line terminal 20-k serving as the master station.

Therefore, if an event occurs in the slave station line terminal 20-m following a poll POL1 from the master station line terminal 20-k, for example, as shown in FIG. 15, a signal is transmitted from the line terminal 20-m to the master station line terminal 20-k only when the line terminal 20-m receives a poll POL3 to the line terminal 20-m following a poll POL2 sent to the other slave station line terminal 20-x. In this case, the master station line terminal 20-k transmits the signal to the server 10 using the IEC 61850 transmission method after receiving the signal from the line terminal 20-m.

Hence, when a combination of the IEC 60870-5-103 transmission method and the IEC 61850 transmission method is used to transmit a signal between line terminals and then transmit the signal from a master station line terminal to the server 10, the time lag LAG2 occurs due to a polling interval, the condition of the individual line terminals, and the transmission line condition.

As is evident from FIG. 15, the time lag LAG2 occurring when the IEC 60870-5-103 transmission method and the IEC 61850 transmission method are combined is larger than the time lag LAG1 occurring when transmission is performed using the IEC 61850 transmission method alone by an amount corresponding to the polling interval.

As described above, with a conventional data transmission method of transmitting a plurality of signals from substation premises to an upper level control center using n-to-one signal transmission, a correlative relationship does not exist between the generation times attached to the plurality of signals transmitted to the server 10 from the substation premises and the order in which the signals reach the server 10. Therefore, even if the signal that arrives first has a late generation time, this generation time may be attached as the generation time of the aggregate signal.

SUMMARY

The present invention is proposed with the aim of solving the problems in the related art described above, and an object thereof is to provide a data transmission method and a server for a substation monitoring control system with which a plurality of signals from substation premises can be aggregated into an aggregate signal using n-to-one signal transmission, and an appropriate time can be attached to the aggregate signal when the aggregate signal is transmitted to an upper level control center.

A data transmission method for a substation monitoring control system according to the present invention includes a server connected to a line terminal on substation premises via a transmission line and implements transmission between the server and an upper level control center, wherein aggregate signal processing for n-to-one signal transmission performed by the server includes waiting processing and time adjusting processing. Here, the aggregate signal processing for n-to-one signal transmission is processing in which a plurality of (n) signals from a plurality of line terminals on the substation premises are aggregated into a single aggregate signal bound for the upper level control center and the aggregate signal is transmitted to the upper level control center. The waiting processing is processing for, from a time point where a first constitutional element signal constituting a specific aggregate signal bound for the upper level control center reaches the server until a wait time that is based on a preset condition elapses, waiting for another constitutional element signal of the specific aggregate signal to arrive. The time adjusting processing is processing for extracting an earliest generation time from generation times attached respectively to constitutional element signals arriving during the waiting processing, and attaching the extracted time as a generation time of the specific aggregate signal. The preset condition relating to the wait time includes one or more conditions selected from a condition employing a preset wait time having a fixed length, a condition according to which the employed wait time is determined on the basis of a preset time having a fixed length, and a condition according to which a time required for all of the constitutional element signals constituting the specific aggregate signal to arrive is set as the wait time.

Further, as regards a server of the substation monitoring control system according to the present invention, features of the data transmission method described above are learned from the viewpoint of a server to which the data transmission method is applied.

In the present invention having the features described above, when signals transmitted from the substation premises are aggregated by the server, during the wait time from when a first signal constituting a specific aggregate signal arrives at the sever, the server waits for the arrival of another signal of the aggregate signal. Following the elapse of the wait time, the earliest generation time from among the generation times attached to the arrived signals is attached as the generation time of the aggregate signal bound for the upper level control center. As a result, the generation time of the aggregate signal to be transmitted to the upper level control center can be made consistent with an actual event occurrence time.

According to the present invention, it is possible to provide a data transmission method and a server for a substation monitoring control system with which a plurality of signals from substation premises can be aggregated into an aggregate signal using n-to-one signal transmission, and an appropriate time can be attached to the aggregate signal when the aggregate signal is transmitted to an upper level control center.

BRIEF DESCRIPTION OF THE DRAWINGS

FIG. 7 is a view showing data set in a server used in a substation monitoring control system according to a fourth embodiment;

DETAILED DESCRIPTION

A plurality of specific embodiments of the present invention will be described below with reference to the drawings. Note that the present invention is not limited to the following embodiments, and various other modified examples may be implemented within the scope of the present invention. More specifically, server processing procedures and data configurations illustrated in the embodiments are merely examples, and specific hardware constitutions and software constitutions of the server, including an aggregate signal processing module and set data configurations packaged therein, may be selected freely. Likewise with regard to the substation monitoring control system to which the present invention is applied, as long as the system transmits signals from substation premises to an upper level control center using n-to-one signal transmission, the present invention may be applied similarly to substation monitoring control systems having various constitutions, and in so doing, similar favorable effects are obtained.

[First Embodiment]
[Constitution]

Figure 1:
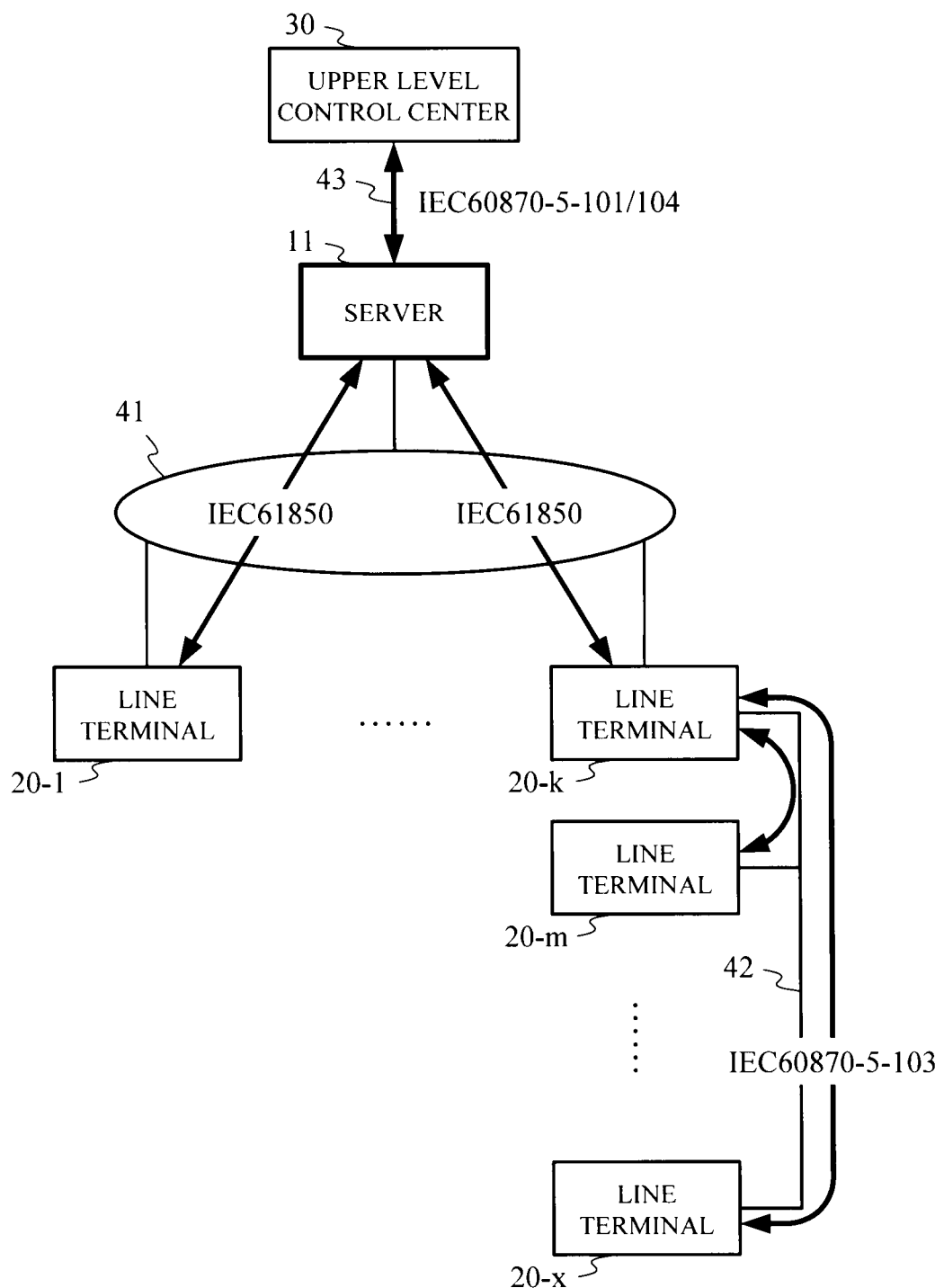
FIG. 1 is a block diagram showing a substation monitoring control system according to a first embodiment.

FIG. 1 is a block diagram showing a substation monitoring control system according to a first embodiment.

Figure 10:
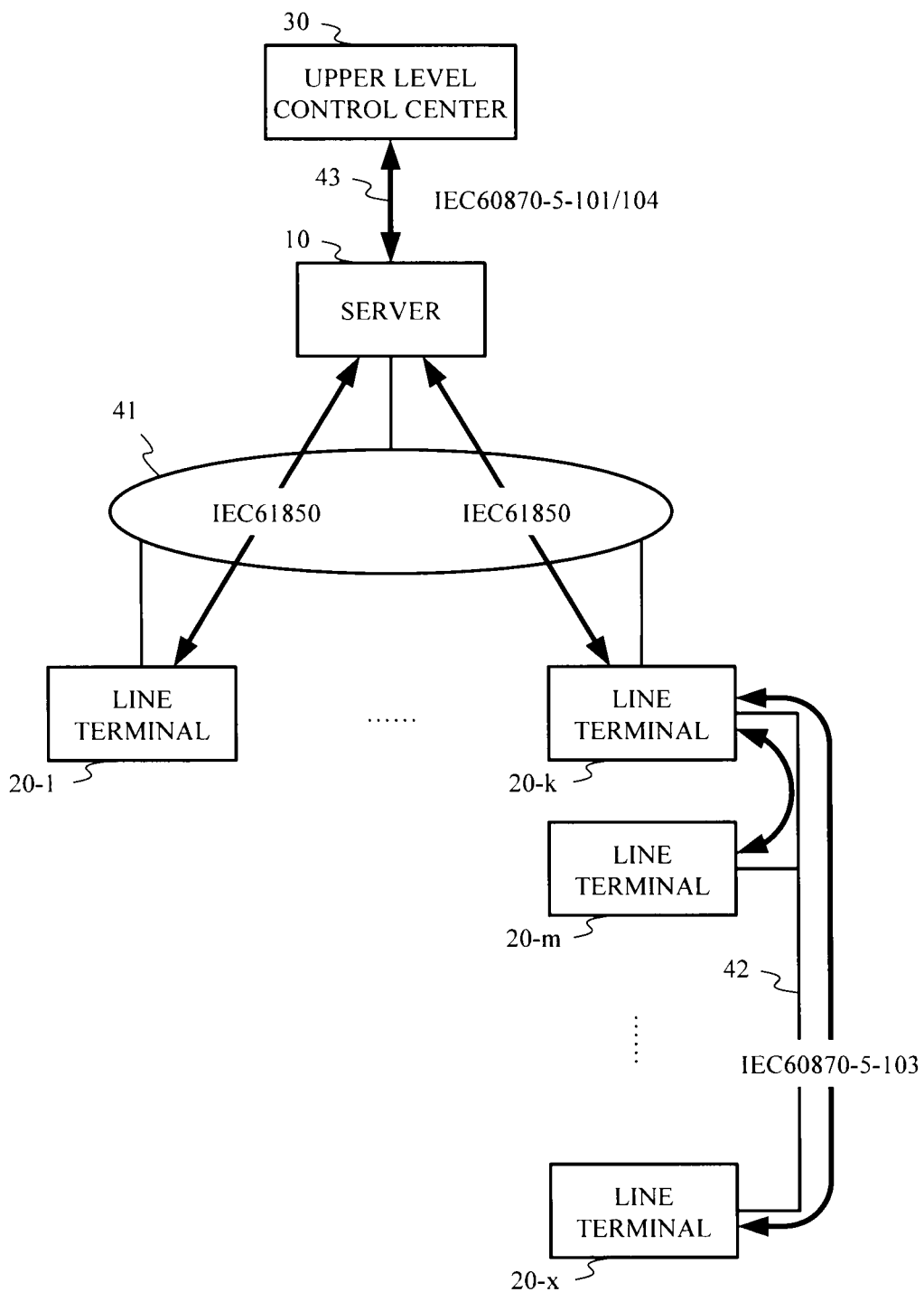
FIG. 10 is a block diagram showing an example of a substation monitoring control system to which IEC standards are applied.

As shown in FIG. 1, this embodiment is realized by modifying the server 10 of the substation monitoring control system shown in FIG. 10 to a server 11 that performs aggregate signal processing serving as a feature of the present invention. Constitutions other than the server 11, or in other words connection configurations of the substation monitoring control system according to this embodiment and the IEC standards applied to respective internal units of the system, are similar to those of the related art shown in FIG. 10.

Figure 11:
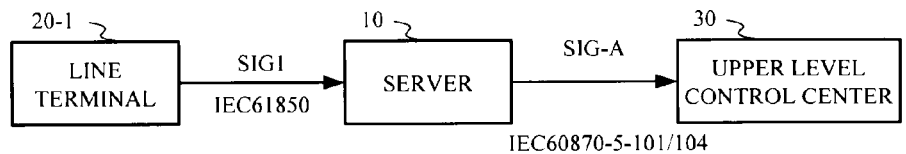
FIG. 11 is a view showing an example of one-to-one signal transmission in the substation monitoring control system shown in FIG. 10.
Figure 12:
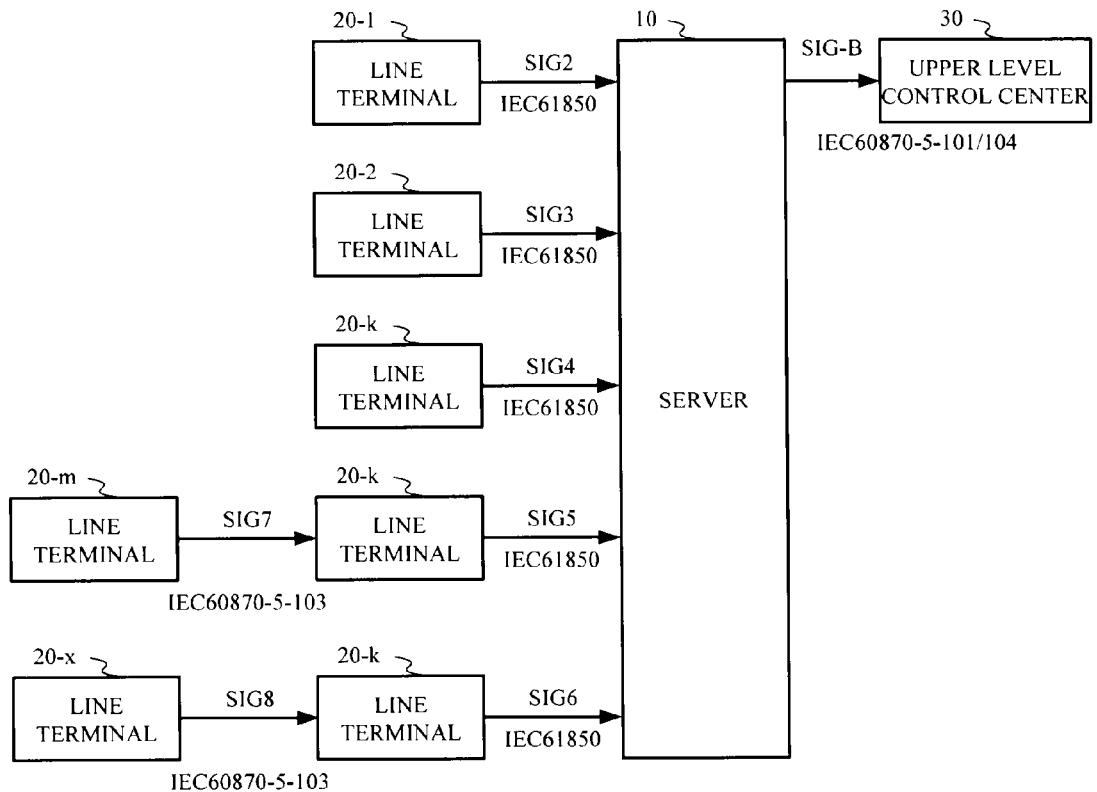
FIG. 12 is a view showing an example of n-to-one signal transmission in the substation monitoring control system shown in FIG. 10.
Figure 13:
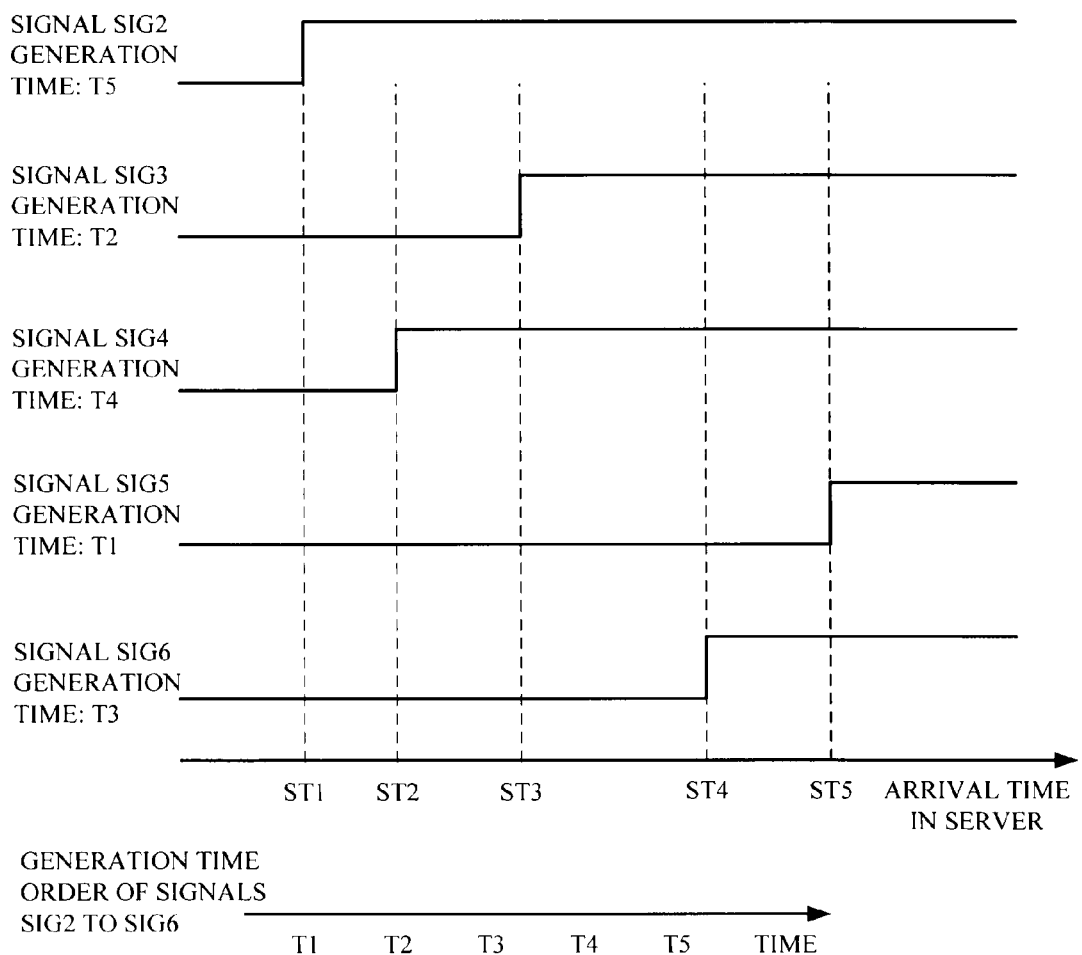
FIG. 13 is a time chart showing an example of signals transmitted in the n-to-one signal transmission shown in FIG. 12 together with generation times and arrival times of the signals.

Further, in the substation monitoring control system according to this embodiment, signal transmission is performed similarly to the example of one-to-one signal transmission shown in FIG. 11 and the example of n-to-one signal transmission shown in FIG. 12.

More specifically, in the one-to-one signal transmission, a signal SIG1 from a line terminal 20-1 is transmitted to an upper level control center 30 from the server 11 as a signal SIG-A. In the n-to-one signal transmission, on the other hand, signals SIG2 to SIG4 from line terminals 20-1, 20-2, 20-k are transmitted directly to the server 11 while signals SIG7, SIG8 from line terminals 20-m, 20-x are transmitted to the server 11 after being converted into signals SIG5, SIG6 by the line terminal 20-k. The signals SIG2 to SIG6 that reach the server 11 are aggregated into an aggregate signal SIG-B by the server 11, whereupon the aggregate signal SIG-B is transmitted to the upper level control center 30.

The server 11 according to this embodiment differs from the conventional server 10 in that waiting processing and time adjusting processing are performed as aggregate signal processing executed during the n-to-one signal transmission from line terminals on the substation premises to the upper level control center. In the waiting processing, await time is spent to wait for the arrival of a plurality of constitutional element signals constituting a specific aggregate signal bound for the upper level control center. In the time adjusting processing, an earliest generation time attached to the constitutional element signals that arrive during the waiting processing is attached as a generation time of the corresponding aggregate signal.

[Actions]

Figure 2:
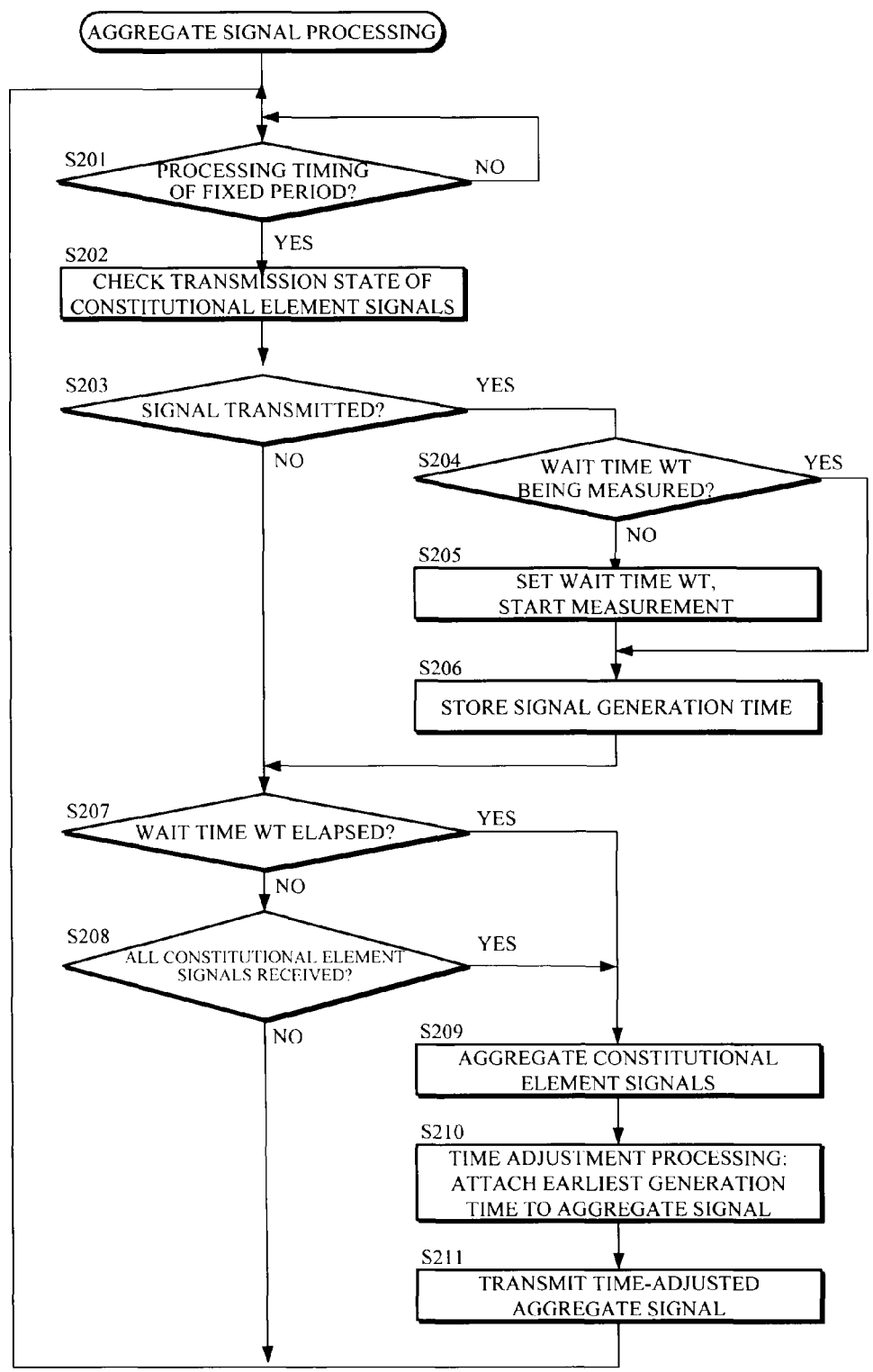
FIG. 2 is a flowchart showing an example of aggregate signal processing for n-to-one signal transmission, which is performed by a server of the substation monitoring control system according to the first embodiment.

FIG. 2 is a flowchart showing an example of aggregate signal processing for n-to-one signal transmission, which is implemented as a program module by the server 11 of the substation monitoring control system according to the first embodiment.

In the aggregate signal processing shown in FIG. 2, every time a processing timing of a preset fixed period arrives (YES in S201), the server 11 checks a transmission state of a plurality of constitutional element signals constituting a single aggregate signal by determining whether or not any of the plurality of constitutional element signals has been transmitted from a transmission source line terminal (S202). Thus, the server 11 determines whether or not signal transmission has occurred (S203).

When it is determined that signal transmission has occurred (YES in S203) and the transmitted signal is the first signal to arrive from among the constitutional element signals constituting the aggregate signal, this means that a wait time WT relating to the aggregate signal is not being measured (NO in S204). Accordingly, the server 11 starts time measurement by setting a value of the wait time WT (S205), and stores the generation time attached to the constitutional element signal (S206).

The server 11 then determines whether or not a first condition is satisfied (S207) and whether or not a second condition is satisfied (S208). The first condition is satisfied when an elapsed time from the start point of time measurement reaches the set value of the wait time WT, or in other words when the set wait time WT elapses, and the second condition is satisfied when all of the constitutional element signals have been input, or in other words when all of the constitutional element signals have reached the server 11.

When neither of the first and second conditions is satisfied (NO in S207 and NO in S208), the server 11 repeats the waiting processing series (S202 to S208) from the transmission state check (S202) to the condition determinations (S207, S208) every time the predetermined timing arrives (YES in S201). More specifically, when it is determined that signal transmission has occurred (YES in S203) during the transmission state check (S202) and the transmitted signal is the second or later signal to arrive from among the constitutional element signals constituting the aggregate signal, this means that the wait time WT relating to the aggregate signal is being measured (NO in S204), and therefore the server 11 stores the generation time attached to the constitutional element signal (S206) and performs the condition determinations (S207, S208).

When one of the conditions is eventually satisfied (YES in S207 or S208) after repeating the waiting processing series (S202 to S208), the server 11 terminates the waiting processing and advances to following processing.

The processing procedure for terminating the waiting processing when one of the first and second conditions is satisfied may also be described as a processing procedure for setting the set wait time WT as a first wait time, setting a time required for all of the constitutional element signals to arrive as a second wait time, and terminating the waiting processing when one of the first wait time and the second wait time elapses.

The server 11 aggregates the constitutional element signals obtained up to termination of the waiting processing into an aggregate signal (S209), and then performs time adjusting processing for attaching the earliest generation time stored in relation to the constitutional element signals as the generation time of the aggregate signal (S210). The server 11 then transmits the time-adjusted aggregate signal to the upper level control center 30 (S211).

The aggregate signal processing can be implemented by the server 11 as a program module, while the time measurement, generation time storage, transmission state check, and various determinations performed in the processing can be implemented easily by basic functions such as a time measurement function, a memory function, and an operation control function, which are realized by basic hardware and basic software such as an operating system provided in the server 11.

Note that the aggregate signal processing series described above is processing performed when an event occurs. In contrast, the return-side aggregate signal processing is performed after the occurrence of an event. The return-side processing differs from the occurrence-side processing in that a determination is made as to whether or not all of the constitutional element signals have returned in the determination of the second condition (S207), and the latest generation time stored in relation to the constitutional element signals is used in the time adjusting processing (S210). Otherwise, the processing is similar to the processing performed when an event occurs.

Figure 3:
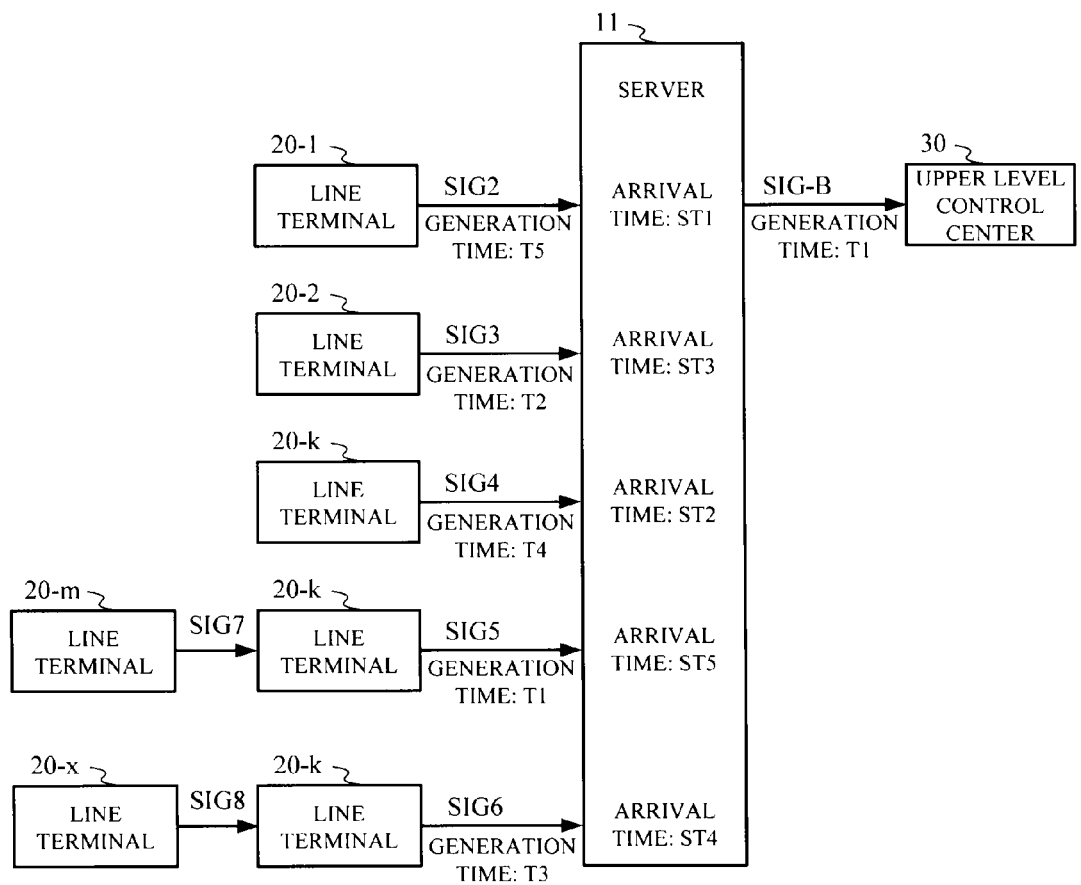
FIG. 3 is a view showing an example of generation times and arrival times of a plurality of signals transmitted from line terminals and a generation time of an aggregate signal generated from these signals, according to the first embodiment.
Figure 4:
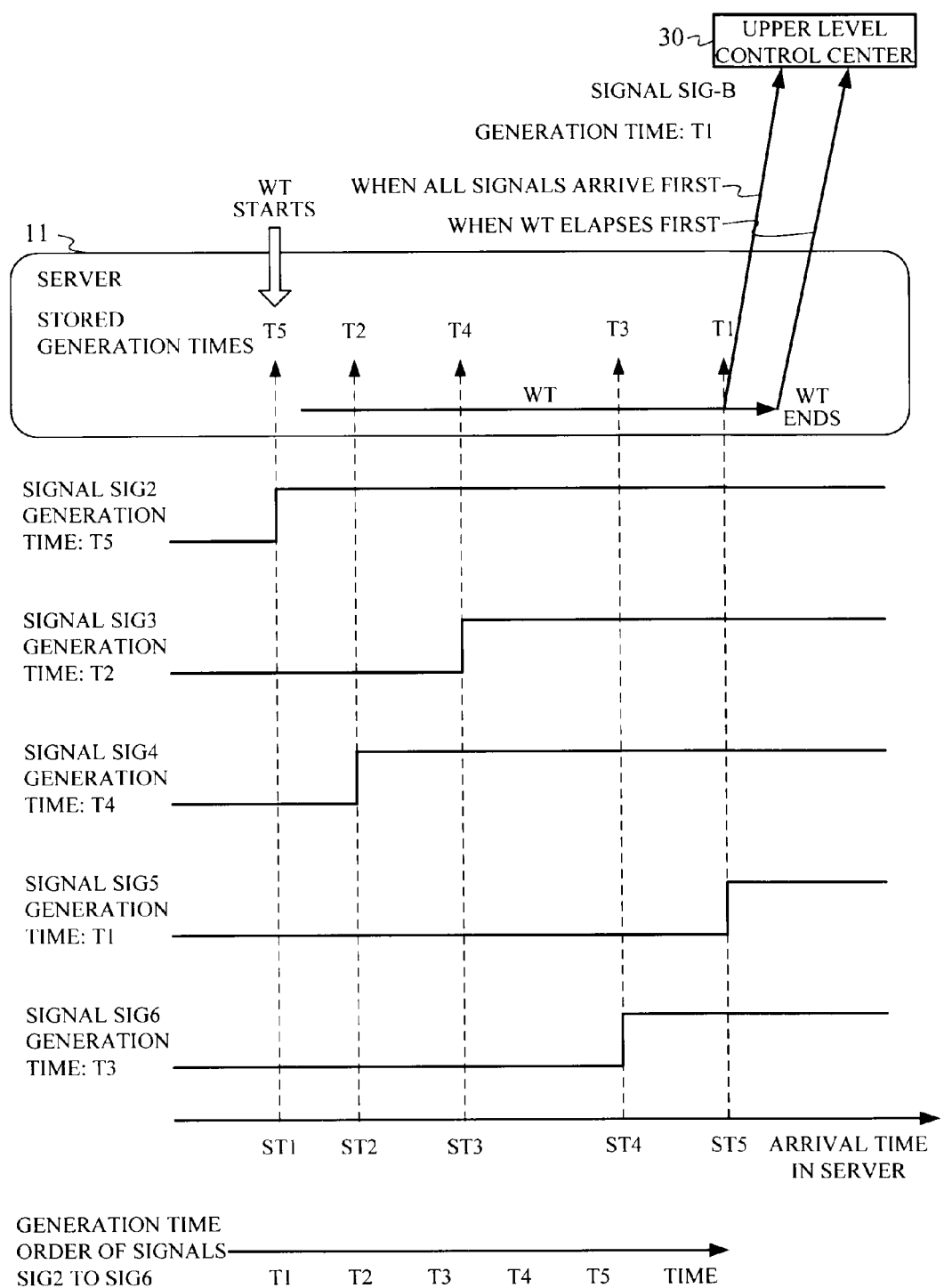
FIG. 4 is a time chart showing a relationship between the generation times and arrival times of the plurality of signals shown in FIG. 3 and the generation time of the aggregate signal.

As shown in FIGS. 3 and 4, by implementing the aggregate signal processing described above, the aggregate signal transmitted to the upper level control center can be made consistent with an actual event occurrence time. This point will be described below.

FIG. 3 is a view showing an example of the generation times and arrival times of the plurality of signals SIG2 to SIG6 transmitted from the line terminals 20 to the server 11 and the generation time of the aggregate signal SIG-B generated from these signals SIG2 to SIG6, according to the first embodiment. FIG. 4 is a time chart showing a relationship between the generation times and arrival times of the plurality of signals SIG2 to SIG6 shown in FIG. 3 and the generation time of the aggregate signal SIG-B.

As shown in FIGS. 3 and 4, when the first signal SIG2 is received at an arrival time ST1, the server 11 starts measuring the wait time WT and stores a generation time T5 of the signal SIG2. The server 11 then receives, in sequence, the signal SIG4 at an arrival time ST2 and the signal SIG3 at an arrival time ST3, and stores a generation time T4 of the signal SIG3 and a generation time T2 of the signal SIG3 upon reception thereof.

The final signal SIG5 is received at an arrival time ST5, whereby all of the constitutional element signals of the aggregate signal SIG-B are received before the set wait time WT elapses. Accordingly, the server 11 terminates the waiting processing at this point, attaches the earliest generation time T1 to the aggregate signal SIG-B, and transmits the aggregate signal SIG-B to the upper level control center 30.

Note that in the above description, for the purpose of simplifying the explanation, the aggregate signal processing is performed on only the single aggregate signal SIG-B shown in FIG. 12. In an actual substation monitoring control system, however, cases in which a plurality of aggregate signals are transmitted to the upper level control center 30 occur frequently. In such cases, the server 11 implements similar aggregate signal processing on each of the plurality of aggregate signals individually, whereupon the individually aggregated aggregate signals are transmitted to the upper level control center 30.

[Effects]

As is evident from the above description, in the first embodiment, aggregate signal processing such as that shown in FIG. 2 is implemented by a server of a substation monitoring control system, and therefore a signal generated earliest can be extracted from the generation times of signals transmitted in random order from line terminals on the substation premises. As a result, as shown in FIGS. 3 and 4, a correct generation time can be attached to an aggregate signal bound for an upper level control center before the aggregate signal is transmitted.

Hence, according to the first embodiment, it is possible to provide a data transmission method and a server for a substation monitoring control system with which a plurality of signals from substation premises can be aggregated into an aggregate signal by using n-to-one signal transmission. Furthermore, an appropriate time can be attached to the aggregate signal when the aggregate signal is transmitted to an upper level control center.

[Second Embodiment]
[Constitution]

Figure 5:
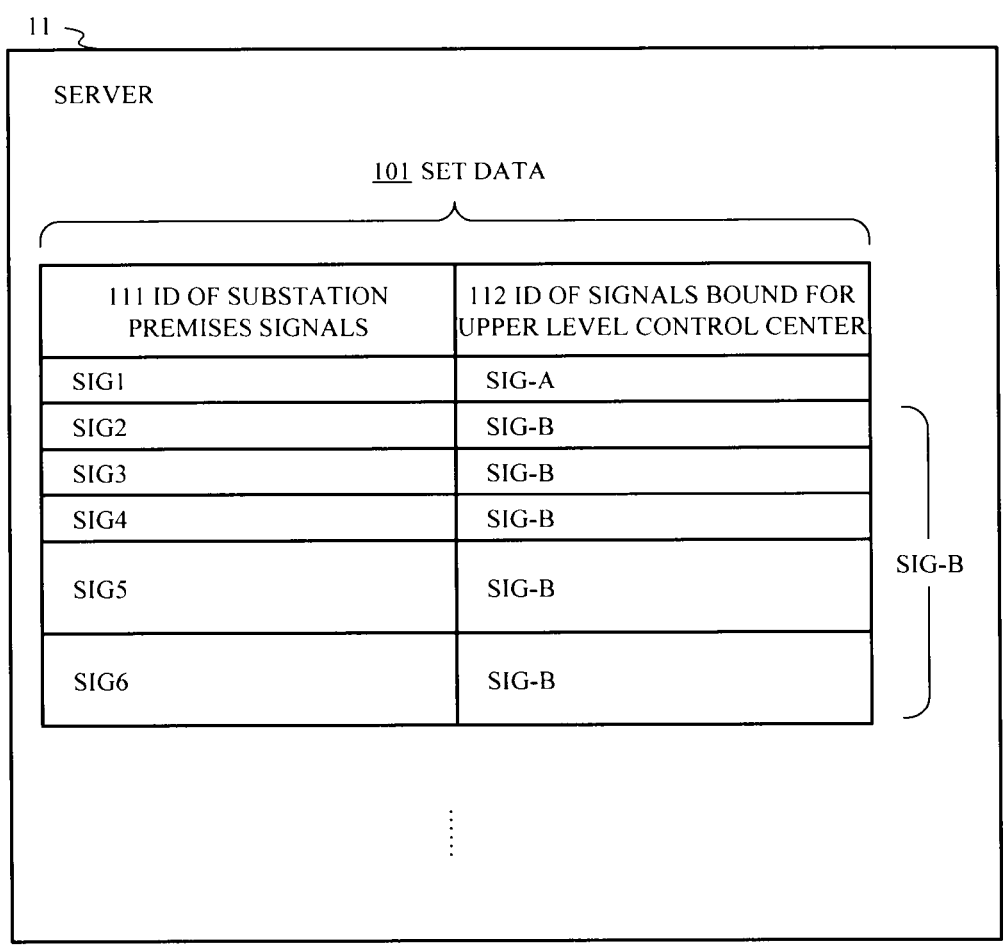
FIG. 5 is a view showing data set in a server used in a substation monitoring control system according to a second embodiment.

FIG. 5 is a view showing set data 101 in the server 11 used in a substation monitoring control system according to a second embodiment.

The set data 101 are data expressing a relationship between the plurality of signals (SIG1 to SIG6, . . . ) transmitted to the server 11 from the line terminals 20 on the substation premises, and the signals (SIG-A, SIG-B, transmitted to the upper level control center from the server 11. In the set data 101, a signal ID 112 of a signal bound for the upper level control center is associated with a signal ID 111 indicating the individual signals from the substation premises. The set data 101 are set in the server 11 in advance before the start of an operation of the substation monitoring control system. Note that apart from use of the set data 101, this embodiment is constituted identically to the first embodiment.

[Actions]

In the second embodiment, the set data 101 shown in FIG. 5 are used, and on the basis of the set data 101, the server 11 can learn, in relation to each signal (SIG-A, SIG-B, bound for the upper level control center, information indicating whether a signal transmission type of the signal (SIG-A, SIG-B, . . . ) bound for the upper level control center is one-to-one signal transmission or n-to-one signal transmission. Hence, in the case of the signal SIG-A transmitted using one-to-one signal transmission, the waiting processing and time adjusting processing can be omitted and the signal SIG1, including the generation time thereof, can be transmitted as the signal SIG-A bound for the upper level control center. Accordingly, implementation of the waiting processing can be limited to cases of n-to-one signal transmission, such as the signal SIG-B.

[Effects]

As is evident from the above description, in the second embodiment, the set data 101 shown in FIG. 5 are set in advance in the server 11 of the substation monitoring control system, and therefore the aggregate signal processing including the waiting processing can be limited in application to signals bound for the upper level control center that require the aggregate signal processing. Hence, in comparison with a method in which the waiting processing is implemented on all signals bound for the upper level control center, a signal delay time between transmission of a signal from a line terminal and transmission of a corresponding signal to the upper level control center can be shortened.

In other words, when the featured waiting processing of the present invention is implemented, a response time of a signal transmitted from the substation to the upper level control center is delayed by the wait time. In the second embodiment, on the other hand, it is possible to differentiate between the one-to-one signal transmission that does not require the waiting processing and the n-to-one signal transmission that requires the waiting processing using the set data 101 of the server, and to implement the waiting processing only in relation to the n-to-one signal transmission. As a result, a delay in the signal response time can be shortened.

[Third Embodiment]
[Constitution]

Figure 6:
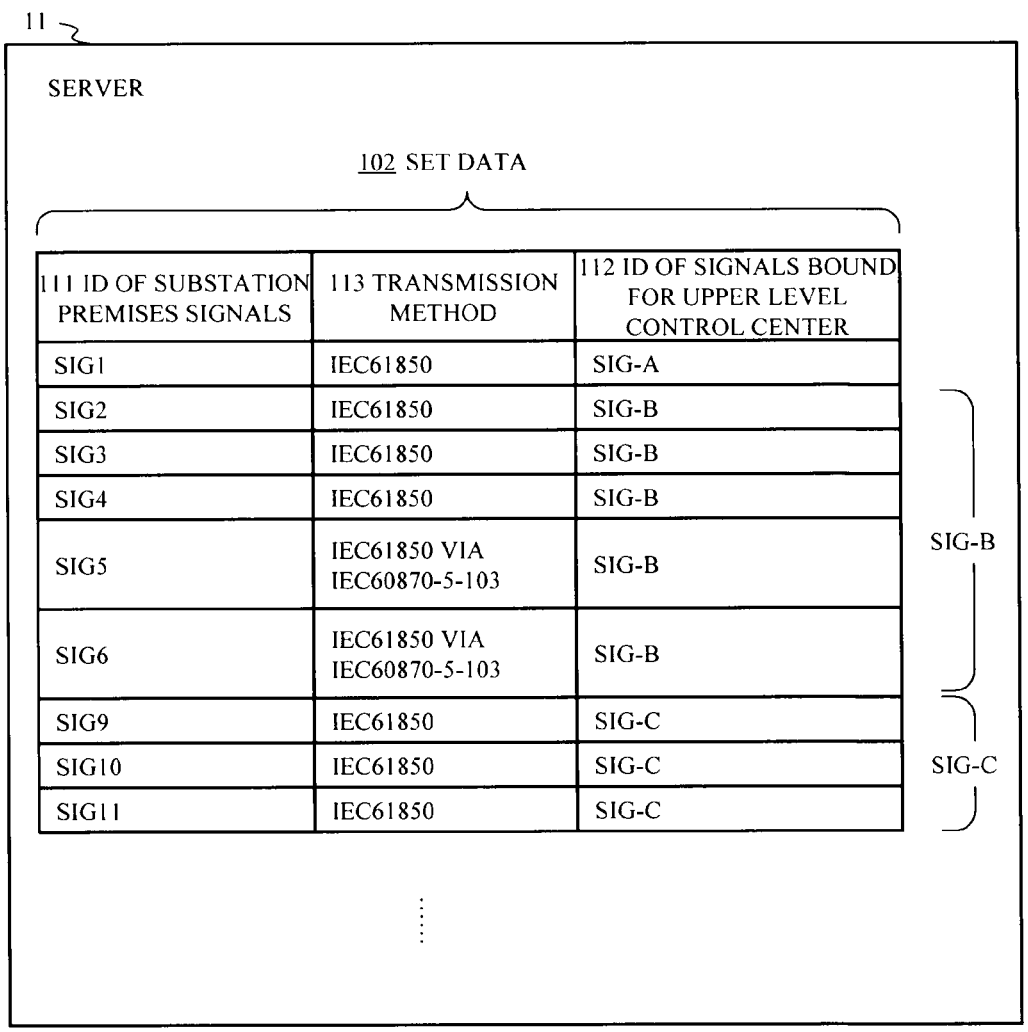
FIG. 6 is a view showing data set in a server used in a substation monitoring control system according to a third embodiment.

FIG. 6 is a view showing set data 102 in the server 11 used in a substation monitoring control system according to a third embodiment.

The set data 102 are data expressing a relationship between a plurality of signals (SIG1 to SIG6, SIG9 to SIG11, . . . transmitted to the server 11 from the line terminals 20 on the substation premises, and signals (SIG-A, SIG-B, SIG-C, . . . transmitted to the upper level control center from the server 11.

In the set data 102, the signal ID 112 of each signal bound for the upper level control center is associated with the signal ID 111 of the individual signals from the substation premises, similarly to the set data 101 of the second embodiment. Furthermore, in the set data 102, a transmission method 113 applied to transmit a signal on the substation premises is associated with each signal ID 111. Moreover, in this embodiment, two wait times LWT, SWT having a long fixed length and a short fixed length, respectively, are set in advance in the server 11 for use as the wait time WT. Other constitutions are similar to those of the second embodiment.

[Actions]

In the third embodiment, the set data 102 shown in FIG. 6 are used, and on the basis of the set data 102, the server 11 can learn, in relation to each signal bound for the upper level control center, information indicating whether the signal transmission type of the signal bound for the upper level control center is the one-to-one signal transmission or the n-to-one signal transmission information. Hence, similarly to the second embodiment, implementation of the waiting processing can be limited to cases of the n-to-one signal transmission.

In addition to this action, when the n-to-one signal transmission is employed in this embodiment, or in other words when the signal bound for the upper level control center is an aggregate signal, the server 11 can determine, on the basis of the set data 102, whether the respective signal transmission methods of the constitutional element signals constituting the aggregate signal bound for the upper level control center include the IEC 60870-5-103 transmission method or only the IEC 61850 transmission method.

Figure 14:
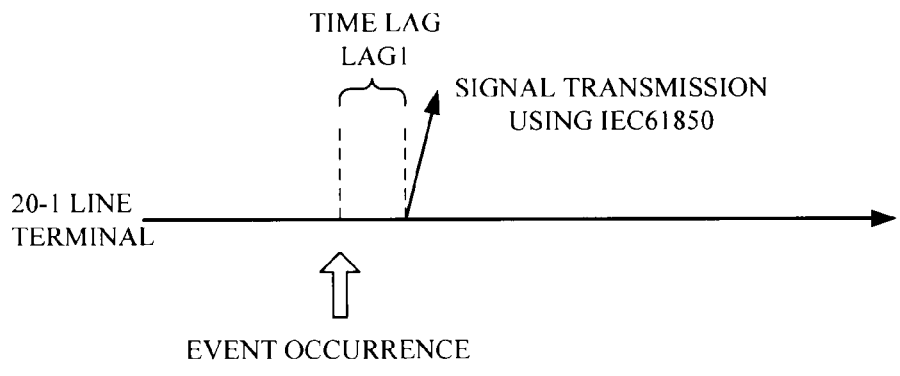
FIG. 14 is a view showing a time lag occurring between the occurrence of an event and transmission when a signal is transmitted using an IEC 61850 transmission method in the substation monitoring control system shown in FIG. 10.
Figure 15:
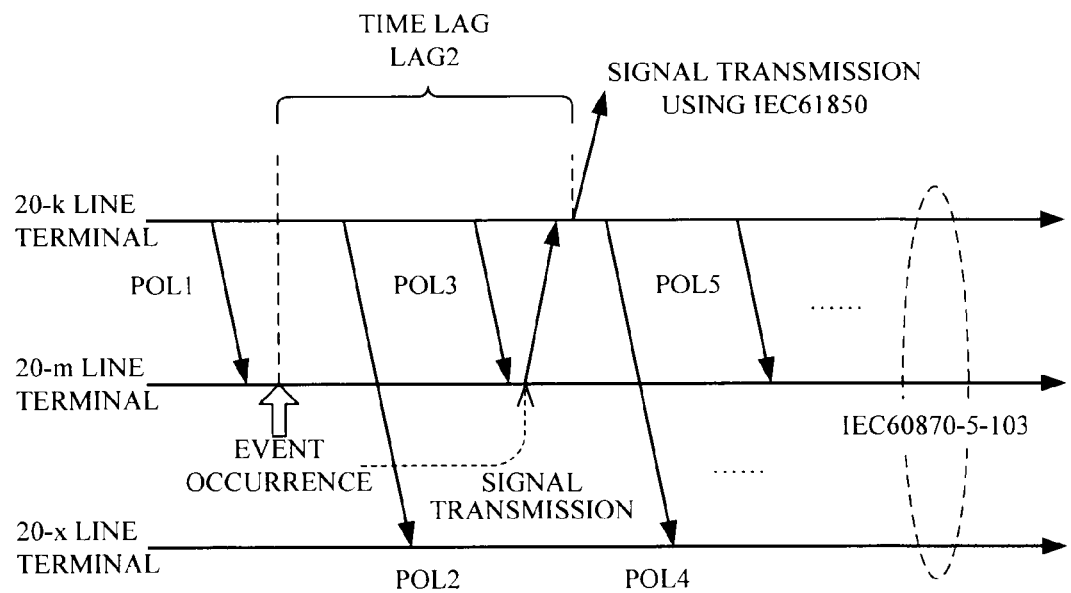
FIG. 15 is a view showing a time lag occurring between the occurrence of an event and transmission when a signal is transmitted using a combination of an IEC 60870-5-103 transmission method and the IEC 61850 transmission method in the substation monitoring control system shown in FIG. 10.

In the example of FIG. 6, it can be determined that the aggregate signal SIG-B bound for the upper level control center includes IEC 60870-5-103 transmission, while the aggregate signal SIG-C does not include IEC 60870-5-103 transmission. As described above with reference to FIGS. 14 and 15, when IEC 60870-5-103 transmission is included, the resulting time lag is greater than when IEC 61850 transmission is employed alone. Therefore, during implementation of the featured waiting processing of the present invention, a longer wait time is required when IEC 60870-5-103 transmission is included than when IEC 61850 transmission is employed alone.

In this embodiment, the two wait times LWT, SWT having a long fixed length and a short fixed length, respectively, are set in advance, and therefore, in accordance with the determination result of the signal transmission method, the server 11 can use the longer wait time LWT for the signal SIG-B that includes IEC 60870-5-103 transmission and the shorter wait time SWT for the signal SIG-C that is transmitted by IEC 61850 transmission alone.

[Effects]

As is evident from the above description, in the third embodiment, the set data 102 shown in FIG. 6 are set in advance in the server 11 of the substation monitoring control system, and therefore application of the aggregate signal processing can be limited to a signal bound for the upper level control center that requires the aggregate signal processing. Moreover, the wait time can be lengthened only when necessary in accordance with the transmission method employed on the substation premises, and shortened in other cases. Hence, in comparison with a method in which a single wait time having a fixed length is used as the wait time of the aggregate signal processing, the signal delay time between transmission of a signal from a line terminal and transmission of a corresponding signal to the upper level control center can be shortened.

[Fourth Embodiment]
[Constitution]

FIG. 7 is a view showing set data 103 in the server 11 used in a substation monitoring control system according to a fourth embodiment.

The set data 103 are data expressing a relationship between a plurality of signals (SIG1 to SIG6, SIG9 to SIG16, ...) transmitted to the server 11 from the line terminals 20 on the substation premises, and signals (SIG-A, SIG-B, SIG-C, SIG-D, ...) transmitted to the upper level control center from the server 11.

In the set data 103, the signal ID 112 of each signal bound for the upper level control center and the transmission method 113 employed on the substation premises are respectively associated with the signal ID 111 indicating the individual signals from the substation premises, similarly to the set data 102 of the third embodiment. In the set data 103 according to this embodiment, a signal SIG-D is denoted as an aggregate signal bound for the upper level control center in addition to the same signals SIG-B, SIG-C as those in the set data 102 of the third embodiment. Further, in this embodiment, two times LT, ST having a long fixed length and a short fixed length, respectively, are set in advance in the server 11 for use during calculation of the wait time WT. Other constitutions are similar to those of the third embodiment.

[Actions]

In the fourth embodiment, the set data 103 shown in FIG. 7 are used, and on the basis of the set data 103, the server 11 can limit implementation of the waiting processing to cases of the n-to-one signal transmission, similarly to the second and third embodiments. When the n-to-one signal transmission is employed in this embodiment, or in other words when the signal bound for the upper level control center is an aggregate signal, the server 11 can determine whether or not IEC 60870-5-103 transmission is included. Furthermore, on the basis of the set data 103, the server 11 can determine the number of constitutional element signals constituting the aggregate signal as well as the number of signals employing the IEC 60870-5-103 transmission method and the number of signals employing the IEC 61850 transmission method therein.

In the example shown in FIG. 7, when a total number of constitutional element signals is expressed as $N_{total}$, a number of signals therein employing only IEC 61850 transmission is expressed as $N_{short}$, a number of signals therein that are transmitted via IEC 60870-5-103 transmission is expressed as $N_{long}$, and a combination of these numbers is expressed as ($N_{total}$, $N_{short}$, $N_{long}$), it is possible to determine that ($N_{total}$, $N_{short}$, $N_{long}$)=(5, 3, 2) in the aggregate signal SIG-B, ($N_{total}$, $N_{short}$, $N_{long}$)=(3, 3, 0) in the aggregate signal SIG-C, and ($N_{total}$, $N_{short}$, $N_{long}$)=(5, 1, 4) in the aggregate signal SIG-D.

As described above, when IEC 60870-5-103 transmission is included, the resulting time lag is longer than when IEC 61850 transmission is employed alone. Furthermore, the time lag increases as the number of aggregated constitutional element signals increases, and therefore a longer wait time is required as the total number of signals increases and the number of signals including IEC 60870-5-103 transmission increases.

In this embodiment, the server 11 uses the number $N_{short}$ of signals employing only IEC 61850 transmission and the number $N_{long}$, of signals transmitted via IEC 60870-5-103 transmission, which are obtained from the set data 103, as well as the preset times LT, ST having a long fixed length and a short fixed length, respectively, to calculate the wait time WT in accordance with a following equation.

$$WT=N_{short} \times ST + N_{long} \times LT$$

By performing this calculation, an optimum wait time WT can be determined in accordance with the total number of constitutional element signals and the number of signals including IEC 60870-5-103 transmission therein. As a result, the waiting processing using the optimum wait time WT can be implemented.

[Effects]

As is evident from the above description, in the fourth embodiment, the set data 103 shown in FIG. 7 are set in advance in the server 11 of the substation monitoring control system, and therefore application of the aggregate signal processing can be limited to a signal bound for the upper level control center that requires the aggregate signal processing. Moreover, an optimum wait time can be calculated in accordance with the total number of constitutional element signals constituting the aggregate signal and the number of signals including IEC 60870-5-103 transmission therein. Hence, in comparison with a method of switching between wait times having fixed long and short lengths as the wait time used in the aggregate signal processing, the signal delay time between transmission of a signal from a line terminal and transmission of a corresponding signal to the upper level control center can be shortened even further.

[Fifth Embodiment]
[Constitution]

The server 11 of a substation monitoring control system according to a fifth embodiment performs the aggregate signal processing shown in FIG. 2 in a similar manner to the first embodiment. Further, as additional processing, the server 11 performs processing to confirm the correctness of the generation time attached to an aggregate signal after transmitting the aggregate signal to the upper level control center in the aggregate signal processing, and when the generation time of the aggregate signal is not correct, the server 11 performs processing to inform the upper level control center or an operator that a waiting processing failure has occurred.

[Actions]

Figure 8:
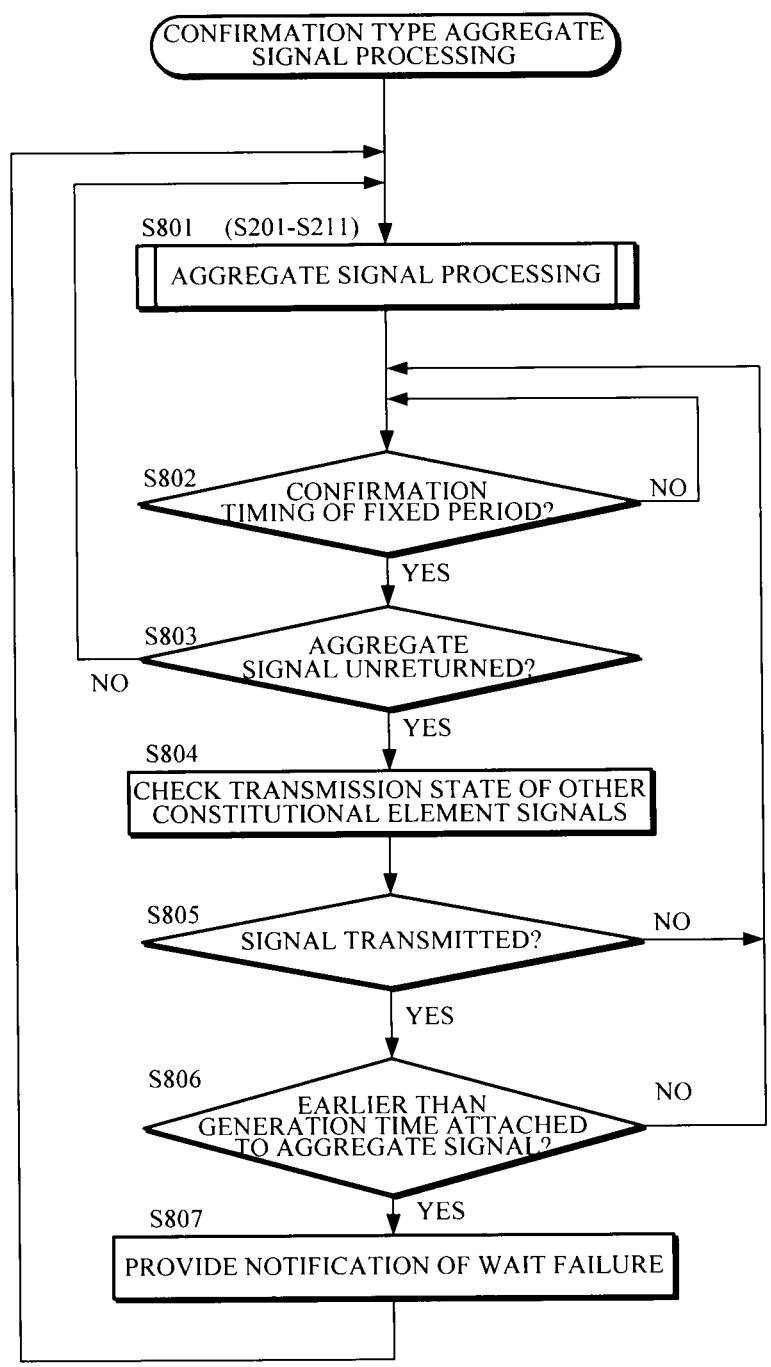
FIG. 8 is a flowchart showing an example of confirmation type aggregate signal processing for n-to-one signal transmission, which is performed by a server of a substation monitoring control system according to a fifth embodiment.

FIG. 8 is a flowchart showing an example of confirmation type aggregate signal processing for n-to-one signal transmission, which is implemented as a program module by the server 11 according to the fifth embodiment.

In the confirmation type aggregate signal processing shown in FIG. 8, the server 11 performs similar aggregate signal processing (S801) to the aggregate signal processing (S201 to S211) shown in FIG. 2. Then, every time a preset confirmation timing of a fixed period arrives (YES in S802), providing the most recently transmitted aggregate signal has not yet been returned (YES in S803), the server 11 determines whether or not another constitutional element signal constituting this aggregate signal has been transmitted (S804). Thus, the server 11 determines whether or not signal transmission has occurred (S805).

When it is determined that signal transmission has occurred (YES in S805) and that the generation time attached to the transmitted constitutional element signal is earlier than the generation time attached to the aggregate signal (YES in S806), it may be determined that the generation time attached to the aggregate signal is not the correct time, and that the waiting processing applied to the aggregate signal has failed. Accordingly, the server 11 transmits a wait failure signal indicating failure of the waiting processing to the upper level control center 30 or an operating terminal of an operator (S807).

By implementing the confirmation type aggregate signal processing described above, the server 11 can check whether or not another constitutional element signal of an aggregate signal transmitted to the upper level control center in the aggregate signal processing (S801) has arrived before the aggregate signal is returned.

Figure 9:
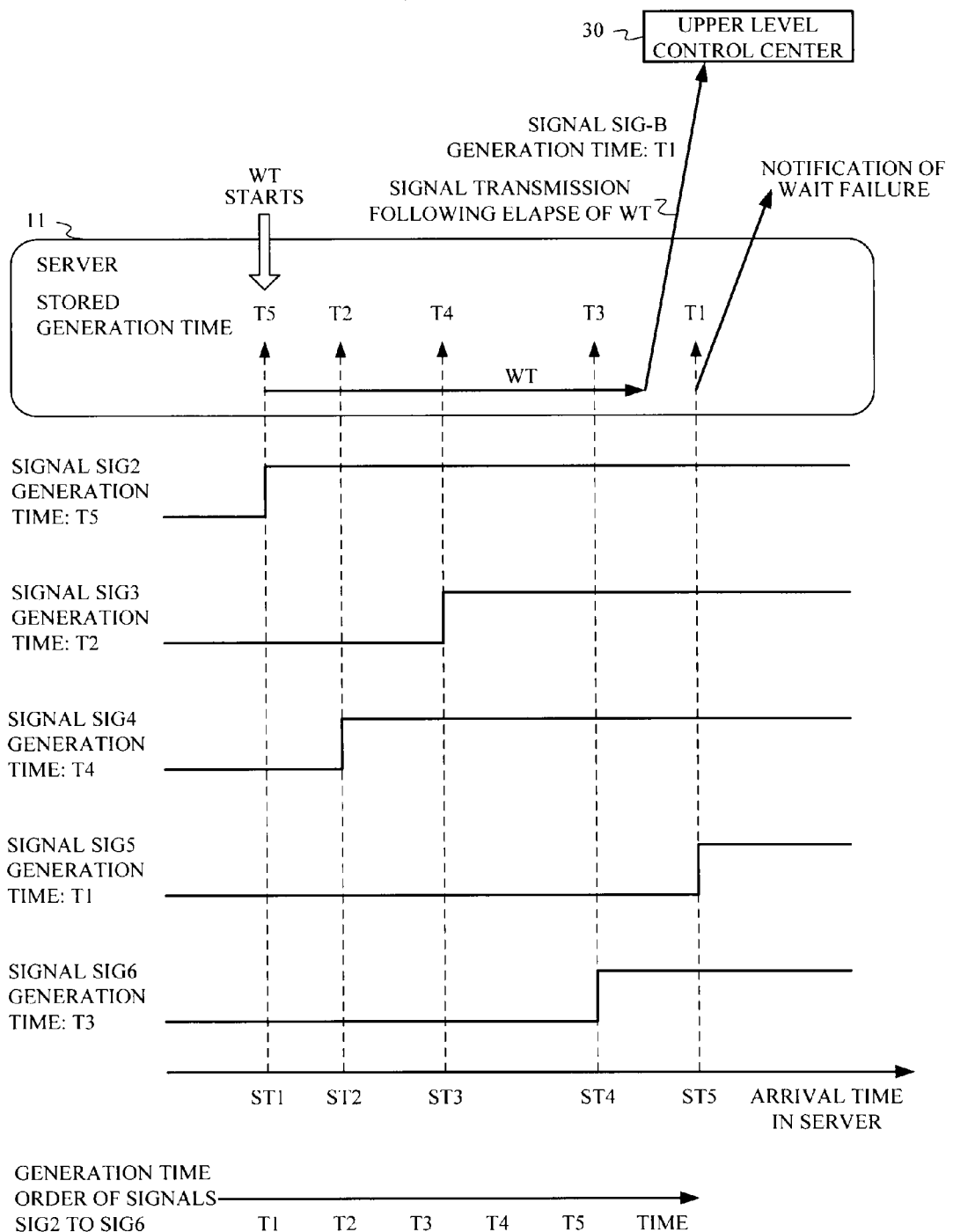
FIG. 9 is a time chart showing an example of a wait failure confirmed by the confirmation type aggregate signal processing of the fifth embodiment.

Therefore, in a case such as that shown in FIG. 9, for example, where the aggregate signal SIG-B having the generation time T2 is transmitted following the elapse of the wait time WT and a constitutional element signal SIG-5 having an earlier generation time T1 than the aggregate signal SIG-B arrives thereafter, a wait failure can be detected. In the example shown in FIG. 9, the server 11 determines that the generation time T2 attached to the aggregate signal SIG-B is not the correct time, and that the correct time that should have been attached is the generation time T1.

[Effects]

As is evident from the above description, in the fifth embodiment, processing for checking whether or not another constitutional element signal of an aggregate signal transmitted to the upper level control center has been transmitted before the aggregate signal is returned is added to the aggregate signal processing performed by the server of the substation monitoring control system. It is therefore possible to determine that the generation time attached to the aggregate signal transmitted to the upper level control center is not the correct time, and notify the upper level control center or an operator thereof. As a result, the upper level control center or the operator can avoid various problems that may occur when the inappropriate time information of the aggregate signal is used.

This invention claimed is:

1. A data transmission method for a substation monitoring control system that includes a server connected to a line terminal on substation premises via a transmission line and implements transmission between the server and an upper level control center, the server performing aggregate signal processing for n-to-one signal transmission, in which a plurality of (n) signals from a plurality of line terminals on the substation premises are aggregated into a single aggregate signal bound for the upper level control center and the aggregate signal is transmitted to the upper level control center, the aggregate signal processing for n-to-one signal transmission including:

waiting processing for, from a time point where a first constitutional element signal constituting a specific aggregate signal bound for the upper level control center reaches the server until a wait time that is based on a preset condition elapses, waiting for another constitutional element signal of the specific aggregate signal to arrive; and time adjusting processing for extracting an earliest generation time from generation times attached respectively to constitutional element signals arriving during the waiting processing, and attaching the extracted time as a generation time of the specific aggregate signal, the preset condition includes at least one time specification condition from among a selection type time specification condition in which an employed wait time is selected from one or a plurality of preset times having fixed lengths, respectively, and a calculation type time specification condition in which the employed wait time is calculated from a preset time having a fixed length in accordance with a number or a ratio of signals transmitted through a predetermined signal transmission method, from among the constitutional element signals constituting the specific aggregate signal, and includes an arrival specification condition in which a time required for all of the constitutional element signals constituting the specific aggregate signal to arrive is set as the wait time, and during the aggregate signal processing for n-to-one signal transmission, the server implements the waiting processing after setting a first wait time on the basis of the time specification condition and setting the time required for all of the constitutional element signals constituting the specific aggregate signal to arrive as a second wait time on the basis of the arrival specification condition, and terminates the waiting processing when one of the wait times elapses.

2. The data transmission method for a substation monitoring control system according to claim 1, wherein information indicating either a non-aggregate signal obtained through one-to-one signal transmission, which is transmitted to the upper level control center as it is without aggregating signals from the substation premises, or an aggregate signal obtained through n-to-one signal transmission, which is transmitted to the upper level control center after aggregating a plurality of (n) signals from the substation premises into a single aggregate signal, is set in advance in the server as information relating to a signal transmission type of a signal bound for the upper level control center to be transmitted to the upper level control center, and on the basis of the information relating to the signal transmission type of the signal bound for the upper level control center, the server performs non-aggregate signal processing for one-to-one signal transmission, in which the waiting processing is omitted and a signal from the substation premises is transmitted as is to the upper level control center without being aggregated, when the signal bound for the upper level control center is the non-aggregate signal obtained through one-to-one signal transmission, and performs the aggregate signal processing for n-to-one signal transmission, including the waiting processing, when the signal bound for the upper level control center is the aggregate signal obtained through n-to-one signal transmission.

3. The data transmission method for a substation monitoring control system according to claim 1, wherein the preset condition includes, as the selection type time specification condition, a long-or-short selection type time specification condition according to which the employed wait time is switched between two preset wait times having a long fixed length and a short fixed length, respectively, in accordance with a signal transmission method used to transmit the constitutional element signals constituting the specific aggregate signal, information indicating a transmission method type corresponding to an IEC standard is set in advance in the server as information relating to a transmission method type used for transmission on the substation premises, and during the aggregate signal processing for n-to-one signal transmission, the server switches between the long and short wait times for use during implementation of the waiting processing, on the basis of the information relating to the transmission method type used for transmission on the substation premises and the long-or-short selection type time specification condition such that when the signal transmission method of a constitutional element signal constituting the aggregate signal includes an IEC 60870-5-103 transmission method, the long wait time is used, and when the IEC 60870-5-103 transmission method is not included, the short wait time is used.

4. The data transmission method for a substation monitoring control system according to claim 1, wherein the preset condition includes the calculation type time specification condition, information indicating a transmission method type corresponding to an IEC standard is set in advance in the server as information relating to a transmission method type used for transmission on the substation premises, and during the aggregate signal processing for n-to-one signal transmission, the server calculates the wait time for use during implementation of the waiting processing, on the basis of the information relating to the transmission method type used for transmission on the substation premises and the calculation type time specification condition, from a number of constitutional element signals constituting the aggregate signal bound for the upper level control center, a number of signals transmitted through IEC 61850 within the constitutional element signals, and a number of signals transmitted through IEC 60870-5-103 within the constitutional element signals.

5. The data transmission method for a substation monitoring control system according to claim 1, wherein the server performs wait failure notification processing for transmitting a signal indicating a wait failure to the upper level control center or providing an operating terminal of an operator with a notification of the wait failure when, after the aggregate signal bound for the upper level control center is transmitted through the aggregate signal processing for n-to-one signal transmission and before the constitutional element signals constituting the transmitted aggregate signal return, another constitutional element signal having attached thereto an earlier generation time than a time attached to the aggregate signal arrives.

6. A server of a substation monitoring control system, which is connected to a line terminal on substation premises via a transmission line and implements transmission to an upper level control center, the server being configured to perform aggregate signal processing for n-to-one signal transmission, in which a plurality of (n) signals from a plurality of line terminals on the substation premises are aggregated into a single aggregate signal bound for the upper level control center and the aggregate signal is transmitted to the upper level control center, the aggregate signal processing for n-to-one signal transmission including:

waiting processing for, from a time point where a first constitutional element signal constituting a specific aggregate signal bound for the upper level control center reaches the server until a wait time that is based on a preset condition elapses, waiting for another constitutional element signal of the specific aggregate signal to arrive; and time adjusting processing for extracting an earliest generation time from generation times attached respectively to constitutional element signals arriving during the waiting processing, and attaching the extracted time as a generation time of the specific aggregate signal, the preset condition includes at least one time specification condition from among a selection type time specification condition in which an employed wait time is selected from one or a plurality of preset times having fixed lengths, respectively, and a calculation type time specification condition in which the employed wait time is calculated from a preset time having a fixed length in accordance with a number or a ratio of signals transmitted through a predetermined signal transmission method, from among the constitutional element signals constituting the specific aggregate signal, and includes an arrival specification condition in which a time required for all of the constitutional element signals constituting the specific aggregate signal to arrive is set as the wait time, and during the aggregate signal processing for n-to-one signal transmission, the server implements the waiting processing after setting a first wait time on the basis of the time specification condition and setting the time required for all of the constitutional element signals constituting the specific aggregate signal to arrive as a second wait time on the basis of the arrival specification condition, and terminates the waiting processing when one of the wait times elapses.

* * * * *